United States Patent Office 3,261,665
Patented July 19, 1966

3,261,665
PROCESS FOR THE TREATMENT OF WASTE SULFURIC ACID PICKLE LIQUOR
Richard K. Rathmell, Wilmington, Del., assignor to E. I. du Pont de Nemours and Company, Wilmington, Del., a corporation of Delaware
No Drawing. Filed Nov. 5, 1962, Ser. No. 235,528
1 Claim. (Cl. 23—122)

This application is a continuation-in-part of my copending application Serial No. 89,114, filed February 14, 1961 (now abandoned).

This invention relates to the treatment of waste pickle liquor.

Waste liquors from pickling operations in the iron and steel industry typically contain about 2 to 15% by weight sulfuric acid and about 5 to 20% by weight iron sulfates in aqueous solution. The liquors additionally may contain small amounts of other metal sulfates, metal sulfides, lubricants, inhibitors, hydrocarbons, and other organics and impurities.

The present invention is believed to be the most efficient effective process ever developed for the disposal of such liquors. Waste solids from the present process are readily obtained having a moisture content as low as 10% and even less, compared with 60% or more of conventional methods. Waste liquids can be re-used or disposed of without difficulty. In one important aspect, iron values can be recovered from the waste liquor as useful magnetic iron oxide of excellent purity.

The process of this invention is a continuous process which comprises neutralizing waste pickle liquor with lime while agitating the liquor, and oxidizing the iron content of the liquor, while maintaining the temperature from about 180° F. to the boiling temperature of the mass and maintaining the pH in the range from 7 to 8, followed by removing water from the mass as by filtration or centrifugation.

In a significant and important feature of the process of this invention, it is important that the neutralizing and oxidizing operation be carried over a period of at least four hours. I have found that the operation must take at least four hours in order to obtain the outstanding results of this invention. The upper time limit is not as critical, with times up to ten or twelve hours being satisfactory. A period of 6 to 8 hours is preferred.

Although the theory is not fully understood, this unusual feature of critical treating time has been found to improve the formation of granular $CaSO_4$ and $Fe_3O_4$ particles which are large, well-formed and remarkably fast-settling. I have found that by my process I can easily produce from normal spent pickle liquors solids of 75 to about 90% by weight of dihydrated $CaSO_4$ particles and the balance iron oxide particles of most unusual quality and properties. The $CaSO_4$ particles are glass-clear in appearance. In shape they are substantially orthorhombic. The iron oxide particles are dense agglomerates of black $Fe_3O_4$.

The neutralized and oxidized solids are also unusual in the ease and speed with which they can be de-watered. By way of illustration of this important characteristic, I have demonstrated that this product can easily be centrifuged to a dry free-flowing crystalline product of on the order of 90 to 95% by weight solids. By comparison, identical centrifuging of comparable sludge from a typical prior art neutralization-oxidation process for spent pickle liquor disposal does not rid the material of a large amount of intergranular water and improvement beyond about 60% solids is not readily obtainable.

The importance of this last-mentioned advantage, namely the ease of de-watering, will be apparent to persons in the art. For example, a sludge containing about 60% solids and 40% water is relatively useless for ground fill since it will not support substantial weight such as vehicles. By contrast, the slightly moist product of 90–95% solids obtainable by practicing my invention is very adequate for ground fill even where heavy loading is to occur.

Perhaps one of the most remarkable advantages of my process lies in the fast-settling nature of the neutralized-oxidized solid particles. In my process I have noted that settling takes place for example at the fast rate of 4 inches per minute merely on standing in the reaction vessel, i.e. the upper portion of the mass clears progressively from top downward at a rate of 4 inches per minute. I am also able reproducibly to obtain a product mass which settles in the bottom of a 100 cc. graduate to over 50% solids within 2 minutes or less.

The above advantages of my process make it possible to remove as much as 85% of the weight of the reaction mass as substantially clear water. The remaining solids are as little as 15% by volume of the starting liquid. This of course permits use of smaller and less expensive equipment at this stage of the process for handling a given amount of starting waste pickle liquor.

As indicated above, this invention has the advantage that the resulting concentrated cake of 15% or less moisture content is dry enough and thick enough to be used immediately as a land fill capable of supporting a heavy weight load. The consistency of the cake of 5–15% moisture content is about that of moist garden soil as compared with prior art cake of 60–70% moisture content which is fluid enough to be pumped. The prior art cake still requires an extended drying time in the open air of upwards of a month before a dumped load is sufficiently dry, compact or concentrated to support another load as fill.

The oxidation of the iron content under the conditions of the invention converts the ferrous salts to iron oxides and particularly to magnetic ferriferrous oxide $Fe_3O_4$. One hundred percent conversion to magnetite is optimum. This magnetite can be inexpensively recovered by magnetic means such as a magnetic separator. By way of illustration, I have easily obtained as high as 98% removal of iron content by a single pass of neutralized and oxidized slurry through a conventional wet magnetic separator. The iron oxide thus recovered is of high purity and is of course useful as a raw material in the metals industry.

The high purity $CaSO_4$ product cake after removal of iron values and de-watering can be utilized to advantage for plaster manufacture, plaster board, cinder blocks, pigments, fillers, soil conditioning, fertilizing and the like. Haulage costs for transporting this cake are lower than for the prior art high moisture cake. Where local circumstances do not favor gypsum utilization, the solids can be used for land fill or piled on a dump. By comparison with products of conventional processes, the elimination of lagoon costs permitted by practice of the present invention is very great indeed.

It can be pointed out that a filter cake of 60% moisture content (40% solids) which contain 100 pounds of solids (calculated dry) weighs 250 pounds. By contrast, a cake of 10 moisture content (90 solids) which contains 100 pounds of solids (calculated dry) weighs only 111 pounds. Even a corresponding 40% moisture content cake weighs only 166 pounds. Thus, a difference or reduction in moisture content of only 50% (from 60% to 10%) reduces the weight load of a cake this size by 139 pounds, or a reduction or saving of over half. This tremendous improvement has vast economic significance and is of interest to the entire iron and steel industry.

In the practice of this invention the neutralizing operation with lime can be done by conventional techniques, for example by admixing with the liquor a slurry of the lime. The oxidation likewise can be accomplished by conventional techniques, for example by bubbling air or oxygen into the mass.

The neutralization and oxidation steps will be carried out at boiling or just below, for maximum benefit according to this invention. It is convenient to conserve the heat of the waste pickle liquor discharged from the hot pickling operation. Because the heat of the reaction will serve to increase the temperature of the mass, the expense of providing additional heat is small. Lime slurry can be made with hot water recovered from the operation. Final temperature control is conveniently made by bubbling steam into the neutralizer, but if the pickle liquor and lime slurry are hot initially it is possible to operate without adding more heat.

It is advantageous to begin the continuous process of this invention by adding a small amount of water to a suitable large vessel equipped with an agitator, then simultaneously introduce the pickle liquor and the lime slurry in separate feeds into the vessel while sparging steam into the mass for temperature control. The lime slurry is added at a fixed rate and liquor feed adjusted to keep pH 7–8 in the mass. Air is bubbled into the mass and, after the required holdup time, material is drawn off continuously at a rate that maintains all conditions of the process as specified.

The concentration of the lime in the slurry for convenience in pumping and handling will be about 10–30% by weight expressed as $Ca(OH)_2$. Solids content in the reactor will ordinarily be kept below about 35 or 40%, and preferably about 20 to 30%.

A particular advantage of the present invention is that an excess of air does no harm and control of air addition is not critical to achieve the outstanding iron oxide form, i.e. that which is densely agglomerated and which is easily magnetically recoverable.

It will be understood that the term "filtration" as used herein is intended to include equivalent practices and certain advantages of economics and better results can be obtained by centrifuging or other solid-liquid separation operation. Filter apparatus of the ordinary platen, vacuum disc, or drum types are suitable. Also, ordinary magnetic separators, with permanent or electrically energized magnets, are suitable, and can be of the rotary separator type. Heat can be supplied from any convenient source, of the many available in the industry such as from coking or smelting operations.

Taking advantage of the fast-settling characteristics of the magnetic iron oxide agglomerates and $CaSO_4$ particle products of this invention, the neutralized and oxidized mass can be held and the solids therein allowed to settle as by holding in a seperate column or tank for at least one minute and preferably 2 to 10 minutes, then decanting the clarified surface liquid. The thicker bottom portion can then be filtered as described above.

I have furthermore found that, for some reason not fully understood, operation according to the narrow conditions of the process of my invention can be carried out continuously using an automatic cell pH meter. This feature is considered remarkable and experts in this field have expressed that they considered such a feat impossible. Prior processes are characterized by such cell deterioration that operation for only an hour or two renders the cell completely inaccurate and inoperative. On the contrary, in a pilot process of the present invention, the same cell unit has been successfully employed for as long as 4 months and longer.

The various aspects of this invention will be better understood by reference to the following illustrative examples.

*Example 1*

In a continuous operation separate streams of (1) waste pickle liquor containing 10–15% ferrous sulfate and 4–6% sulfuric acid and (2) a 15–20% lime slurry, each preheated to 195–200° F., are introduced into a reactor equipped with agitator. The liquor is fed at a rate of about 30 gallons per minute and the lime slurry is fed at a rate of 18 gallons per minute, with a pH of 7.2 being maintained in the reactor by adjustment of the liquid flow. The neutralization heat of reaction raises the temperature to 210–214° F. Holdup time in the reactor averages about one-half hour. The neutralized mass from the reactor is continuously taken off in a side stream at a rate that maintains a reasonably constant volume in the reactor. This stream flows to a separate tank equipped with a sparge line for steam introduction and a separate sparge line for air introduction near the bottom of the tank. The pH is maintained at about 7.2–7.4 and the temperature at or near boiling. Air is bubbled into the mass in the tank at a rate of 200 cubic feet per minute. Average holdup time in this tank is 5½ hours and the resulting magnetic oxides are removed from the slurry either batchwise or continuously by a conventional rotary drum magnetic separator. The separated magnetic particles are of excellent particle size and purity can be used as such. The remaining slurry is de-watered in a centrifuge. The liquid discharge from the centrifuge can be recycled to the line slurry make-up system or disposed of directly without contamination into the sewage system. The cake from the centrifuge is an excellent quality calcium sulfate cake of 5% moisture content which can be trucked directly for land fill or other use.

The preceding and the following examples as will be readily understood can be repeated using equivalent equipment and materials. Other alkaline earth materials can easily be substituted as taught herein with satisfactory results.

*Example 2*

Into a neutralizer containing 300 gallons of agitated reaction slurry at 190° F. and 7.0 pH, balanced streams of lime slurry and pickle liquor are added continuously. The lime rate is set at 0.22 g.p.m. and the acid flow, which is automaticaly regulated by the pH controller, averages 0.36 g.p.m. Air is bubbled into the reactor near the agitator at a rate of 3.6 c.f.m., and a small amount of steam is admitted into the slurry to maintain the temperature. Slurry is continuously withdrawn to maintain a constant level in the neutralizer. Holdup time in the reactor averages about 5½ hours. The slurry is fed to a continuous solid bowl centrifuge which discharges a stream of clear water at 7.0 pH, and a stream of sandy solids with 5% moisture. The clear water contains only two parts per million of iron.

A sample is taken of the slurry withdrawn from the reactor prior to being fed to the centrifuge. The sample is placed in a standard 100 cc. graduate. The slurry settled quickly; after one minute there is 22 cc. sludge and 4¼ inches of water; at two minutes 21 cc. of sludge, and within five minutes terminal conditions are reached with 20 cc. of sludge. The quickly settled sludge, with some water in the spaces between solids particles, contains 57% solids by weight. When the solids are mechanically disturbed or withdrawn, the particles are re-oriented to expel more water, giving over 60% solids in the undrained mixture.

The invention claimed is:

In a process for the treatment of waste sulfuric acid pickle liquor by adding to a reaction vessel a lime slurry and said liquor, mixing the reaction mass at a temperature in the range of from 180° F. to the normal boiling point of said mass while bubbling air therethrough, and subsequently separating the aqueous content and the solids content composed essentially of calcium sulfate and ferrosoferric oxide particles, of said reaction mass from each other, the steps of simultaneously adding separate streams of said liquor and lime slurry into said reaction vessel at such rates of addition in relation to one another so as to constantly maintain the pH of the reaction mass in a range of from 7 to 8, and withdrawing a stream of said reaction mass from the reaction vessel at a rate to provide a reaction mass hold-up time of at least four hours.

References Cited by the Examiner

UNITED STATES PATENTS 997,237   7/1911   Carrick et al. _____ 23—200

OTHER REFERENCES

Hoak et al.: "Lime Treatment of Waste Pickle Liquor," Industrial and Engineering Chemistry, volume 39, No. 2, February 1947, pages 131–135.

OSCAR R. VERTIZ, *Primary Examiner.*

MAURICE A. BRINDISI, BENJAMIN HENKIN,
*Examiners.*

E. C. THOMAS, J. J. BROWN, *Assistant Examiners.*